United States Patent
Nugent

[15] 3,703,084
[45] Nov. 21, 1972

[54] BOOM SYSTEM FOR OIL CONTAINMENT
[72] Inventor: John B. Nugent, Winthrop, Mass.
[73] Assignee: Massachusetts Institute of Technology, Cambridge, Mass.
[22] Filed: Jan. 13, 1971
[21] Appl. No.: 106,225

[52] U.S. Cl. .................................................61/1 F
[51] Int. Cl. ............................................E02b 15/04
[58] Field of Search .................................61/1 F, 5

[56] References Cited

UNITED STATES PATENTS 3,597,924   9/1971   Risin ..........................61/1 F
2,658,350   11/1953   Magill ..........................61/5

Primary Examiner—Peter M. Caun
Attorney—Thomas Cooch, Martin M. Santa and Arthur A. Smith, Jr.

[57] ABSTRACT

An improved boom system for the containment of oil spills on the surface of water, essentially comprising a multiplicity of intercoupling cells comprising floatatable material, open at top and bottom, forming an indepth barrier that is wave conformal, the barrier being appropriately stabilized by weights and being coupled to a tether boom, which, in turn, is connected to moorings. Oil carried over the barrier face by waves is trapped in the cells as is oil carried under the barrier face by current flow.

Figure 3:
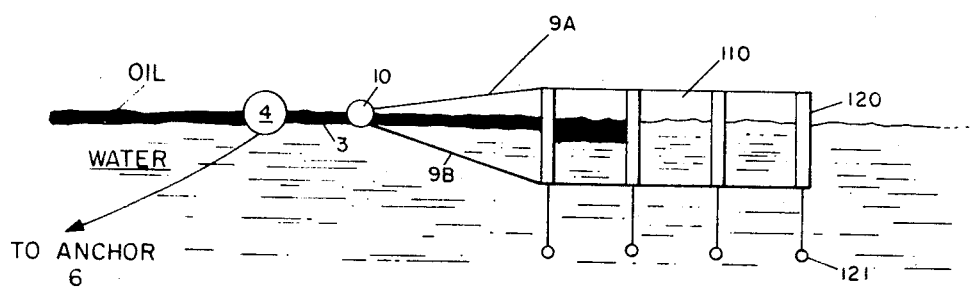

2 Claims, 3 Drawing Figures 3,703,084

BOOM SYSTEM FOR OIL CONTAINMENT

BACKGROUND OF THE INVENTION

1. Field of the Invention

This invention relates generally to anti-pollution apparatus and more particularly to a new and improved boom system for the containment of oil spills on water.

2. Description of the Prior Art

Oil spills on water are the result of accidents occurring during the production, distribution, and consumption of crude oil and its derivatives. Most such accidents involve ship loading and unloading, groundings and collisions and, to a lesser extent, offshore drilling blowouts and pipe fractures. The oil from these spills floats on the surface of the sea in patches called slicks. There are a number of different approaches to this problem, including the use of chemical emulsifiers, collectors, air barriers, and booms, described in considerable detail in the literature.

Of these various approaches, oil booms are in common use today in an attempt to contain oil spillage. A major disadvantage of presently available oil booms, however, lies in the fact that oil may be carried over the boom by waves and under the boom by currents. In fact, a review of the literature indicates that oil booms are generally ineffective in sea states over about 2 to 4 feet and in currents over 0.7 knot. Hence, booms available to date are effective only under conditions of very calm sea (little waves) and very low current.

SUMMARY

In view of the foregoing limitations existing in the presently available booms used to contain oil spillages on water, it is a general object of the invention to provide a simple, effective, and inexpensive boom system that is capable of oil containment despite relatively heavy sea states and/or strong currents.

It is another object of the invention to provide a boom system that is designed to form a wave conformal in-depth barrier such as to contain oil driven over the face of the barrier by waves or under the face of the barrier by currents.

These and other objects are met by a boom system comprising a multiplicity of cells, open at top and bottom, interconnected to form a horizontal in-depth barrier called the "oil boom" which, in the preferred embodiment, resembles a honeycomb and which is designed to be wave conformal. The cells are constructed of membrane-like plastic material and floatation, and are designed to form pockets for the collection and containment of oil. The oil boom or barrier, in turn, is coupled to a tether boom which is attached to moorings. The oil boom is partially submerged as is explained in the specification. Oil washed over the face of the oil boom or carried under it is trapped in the pockets or cells towards the top of which the horizontal velocity is considerably less than the current, preferably zero, despite the state of the sea or the magnitude of the current.

Further objects, features and advantages of the present invention and a better understanding thereof will become apparent in the following detailed description taken in conjunction with the accompanying drawings.

DRAWINGS

Figure 1:
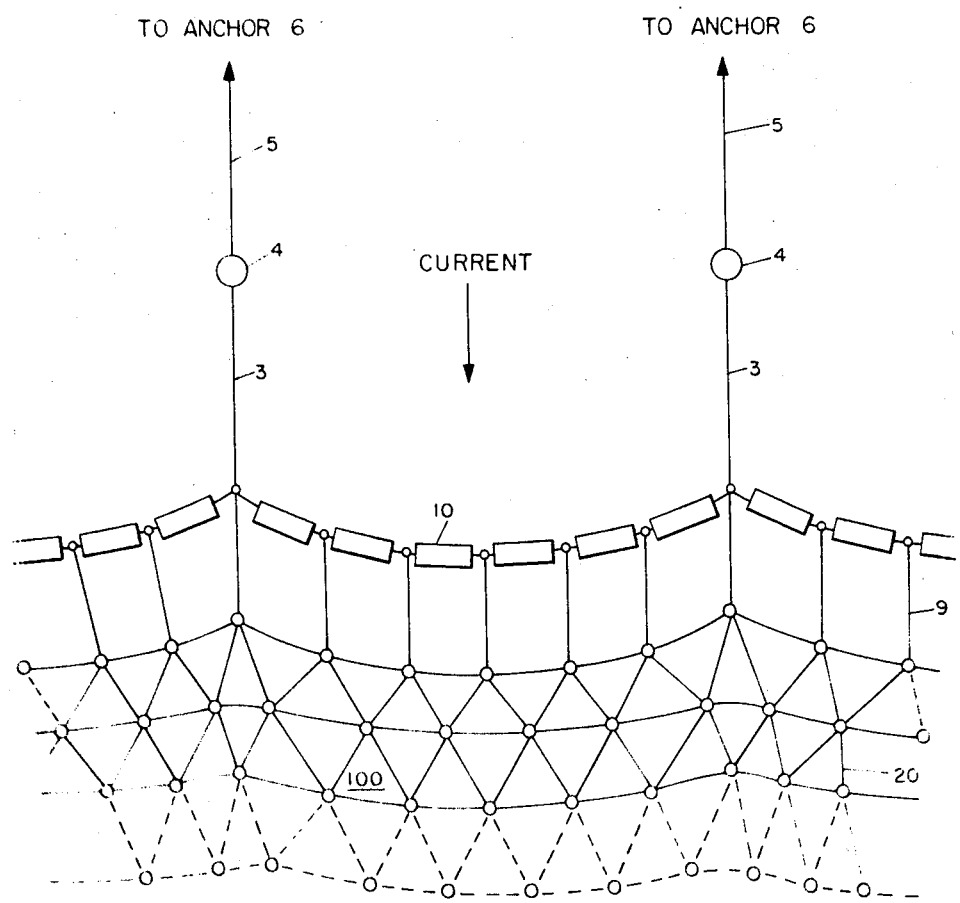
Figure 2:
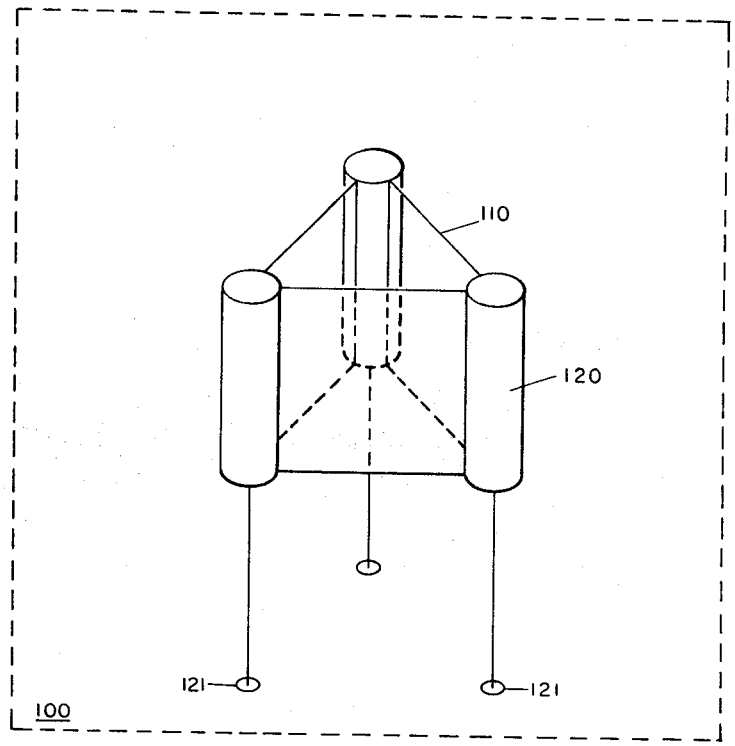

FIG. 1 is a plan view of the overall invention.
FIG. 2 shows one of the cells comprising the oil boom or barrier of FIG. 1.
FIG. 3 is a vertical section of the invention of FIG. 1.

PREFERRED EMBODIMENT

As shown in FIG. 1, the preferred embodiment of subject invention comprises oil boom or barrier 20 coupled via lines 9 to tether boom 10 which, in turn, is attached to mooring floats 4 via mooring pennants 3. Oil boom 20 comprises a multiplicity of cells 100 interconnected so as to give the appearance of a honeycomb design. In the preferred embodiment, moorings comprised of anchors 6, lines 5, floats 4 and pennants 3 maintain the tether boom in the desired location. Tether boom 10 comprises a series of lightweight plastic floats strung together in a line at spaced intervals. In the preferred embodiment, the floats are 6 inches in diameter and 2 feet in length.

Referring now to FIG. 2 in conjunction with FIG. 1, each of cells 100 comprises three sheets 110 of plastic membrane material arranged in a triangular configuration and coupled together at each vertex of the triangle via floats 120. (It is understood that the cells may take other shapes such as hexagonal, for example, as long as the desired pockets are formed.) In the preferred embodiment membrane sheets 110 are constructed of reinforced plastic, i.e., woven fabric coated with plastic, and approximately three feet by 3 feet in dimension. Floats 120 are formed of a plastic such as polyethylene and are cylindrically configured, having a diameter of three inches and a vertical length of 3 feet. Suspended from the bottom of each of floats 120 is a weight 121 designed to keep the cells essentially in the vertical position relative to the surface of the water. Oil boom 20 is located in the water according to a preferred ratio, to wit, twice as much of cell 100 is submerged as it is above the surface of the water. In the case of the preferred embodiment, cell 100 is located such that one foot projects above the water, leaving 2 feet submerged.

Vertical stability is of considerable importance to the operating efficiency of the boom system. Such stability is achieved in the preferred embodiment as shown in FIG. 3. As noted therein, each float 120 has suspended therefrom a weight 121. Further, floats 120 are coupled via membrance sheet 110. Additional stability is effected through the use of line pairs 9a and 9b coupled at one end to the top and bottom of each of floats 120 comprising the barrier face and coupled at the other end to tether boom 10, which, in turn, is coupled to large mooring floats 4. The overall effect is such as to maintain the oil boom face essentially vertical relative to the surface of the water while simultaneously preventing oil boom 20 from being totally submerged due to strong currents and enabling it to be wave conformal.

Referring now to FIGS. 1 through 3, the improved boom system operates as follows. Where there is both wave motion and current flow, the oil is carried along the surface of the water until it reaches oil boom or barrier 20. High wave action causes water and oil to spill over the barrier face into the pockets or cells 100. If there is also a strong current, a certain percentage of the oil is entrained or carried under barrier 20. As the current flows under the barrier, however, the oil exhibits a tendency to rise up into the pockets of water formed by cells 100. As the oil is carried along under the barrier, a certain portion is trapped by each of the succeeding cells. As aforementioned, the horizontal velocity of the water towards the top of the cells is considerably less than the current, preferably zero. Because of this velocity condition within the cell and because of the natural tendency of the oil to rise above water, the oil trapped in the cells remains contained therein unaffected by the current flow ro by wave motion. The contained oil can then be removed by pumping or other means.

As is known in marine engineering, the velocity/turbulence of water trapped within the cells will be a function of a number of factors, including the depth of submergence of the cells, the size and shape of the cells relative to the submergence, the spacing between cells in the barrier, and the velocity of the current.

It is understood that a number of possible variations to the above described apparatus are contemplated while still remaining within the scope of the invention. For example, although specific types of material were mentioned for the preferred embodiment it is only necessary that the material used exhibit proper floatation characteristics for buoyancy and be sufficiently flexible to enable the system to be wave conformal. Further, it is understood that oil boom or barrier 20 may be coupled in any of a variety of ways to the tether boom which, of course, may also assume a number of possible configurations as described in the literature. For example, the tether boom is in no way limited to the particular float configurations described in the preferred embodiment, and, in fact, most available tether booms would work equally well. It is also contemplated that the floats and weights may be integrated, to wit, the weight may be inside of and at one end of the float, resulting in a ballasted, vertically stable float. Further, the cells may take any shape conducive to forming the desired pockets. Where the invention is to be used for reversing current, the invention will function efficiently merely by coupling a second tether boom to the other side of barrier 20 such that barrier 20 is then strung between two tether booms.

Having thus described my invention, I claim:

1. An improved boom system for the containment of oil spills on the surface of water, comprising in combination:
   a. A first boom comprising a multiplicity of cells interconnected so as to form a weblike barrier having vertical and horizontal dimension relative to the surface of said water, said barrier comprising at least two horizontal rows of said interconnected cells, each of said cells being open at the top and bottom and comprising a vertically extending hollow segment of floatatable material, said barrier being designed such that, upon partial submergence, the horizontal velocity of water towards the top of said cells is considerably less than the current;
   b. weights coupled to said fist boom for maintaining said first boom partially submerged in said water;
   c. a tether boom tied to said first boom;
   d. by lines which connect said first boom to said tether boom such as to maintain said first boom essentially vertical relative to the surface of said water; and
   e. mooring means coupled to said tether boom.

2. An improved boom system for the containment of oil spills on the surface of water, comprising in combination:
   a. A first boom comprising a multiplicity of cells interconnected so as to form a weblike barrier having vertical and horizontal dimension relative to the surface of said water, said barrier comprising at least two horizontal rows of said interconnected cells, each of said cells having floatation and having at least three sides, extending vertically down from the surface of said water, said cells being open at the top and bottom, said barrier being designed such that, upon partial submergence, water towards the top of said cells is at essentially zero horizontal velocity;
   b. weights coupled to said first boom for maintaining essentially two-thirds of said first boom submerged in said water;
   c. a tether boom;
   d. lines connecting the top and bottom of the face of said first boom to said tether boom;
   e. mooring floats;
   f. pennants connected to said tether boom and said mooring floats; and
   g. anchors coupled to said mooring floats.

* * * * *